(12) United States Patent
Moody, III et al.

(10) Patent No.: US 11,821,121 B2
(45) Date of Patent: Nov. 21, 2023

(54) BIOPOLYMER-CONTAINING NONWOVEN FABRIC

(71) Applicant: Berry Global, Inc., Evansville, IN (US)

(72) Inventors: Ralph A. Moody, III, Mooresville, NC (US); Steven Brian Burgess, Statesville, NC (US)

(73) Assignee: BERRY GLOBAL, INC., Evansville, IN (US)

( * ) Notice: Subject to any disclaimer, the term of this patent is extended or adjusted under 35 U.S.C. 154(b) by 54 days.

(21) Appl. No.: 17/061,726

(22) Filed: Oct. 2, 2020

(65) Prior Publication Data
US 2021/0102320 A1    Apr. 8, 2021

Related U.S. Application Data

(60) Provisional application No. 62/910,630, filed on Oct. 4, 2019.

(51) Int. Cl.
| | |
|---|---|
| *D04H 1/498* | (2012.01) |
| *D04H 1/425* | (2012.01) |
| *D04H 1/55* | (2012.01) |
| *D04H 1/4382* | (2012.01) |
| *D04H 1/559* | (2012.01) |

(52) U.S. Cl.
CPC .......... *D04H 1/498* (2013.01); *D04H 1/425* (2013.01); *D04H 1/43828* (2020.05); *D04H 1/55* (2013.01); *D04H 1/559* (2013.01); *D10B 2201/20* (2013.01); *D10B 2331/041* (2013.01)

(58) Field of Classification Search
CPC .......... D04H 1/498; D04H 1/425; D04H 1/55; D04H 1/559; D04H 1/43828; D10B 2201/20; D10B 2331/041
See application file for complete search history.

(56) References Cited

U.S. PATENT DOCUMENTS

| | | |
|---|---|---|
| 6,314,627 B1 | 11/2001 | Ngai |
| 6,735,833 B2 | 5/2004 | Putnam et al. |
| 6,903,034 B1 | 6/2005 | Putnam et al. |
| 7,091,140 B1 | 8/2006 | Ferencz et al. |
| 7,406,755 B2 | 8/2008 | Putnam et al. |
| 2003/0106568 A1 | 6/2003 | Keck et al. |
| 2003/0114071 A1* | 6/2003 | Everhart ............... D04H 1/495 442/364 |
| 2010/0318050 A1 | 12/2010 | Topolkaraev et al. |

(Continued)

FOREIGN PATENT DOCUMENTS

EP    2456585 A2    5/2012

OTHER PUBLICATIONS

International Search Report and Written Opinion dated Jan. 12, 2021 in corresponding international application No. PCT/US2020/053921, all enclosed pages cited.

*Primary Examiner* — Jeremy R Pierce
(74) *Attorney, Agent, or Firm* — BURR & FORMAN LLP

(57) ABSTRACT

Nonwoven fabrics including a first spunmelt through-air-bonded (TAB) nonwoven layer comprising a first plurality of spunmelt fibers, in which the first plurality of spunmelt fibers comprise a biopolymer. The first plurality of spunmelt fibers may be physically entangled with cellulosic fibers, such by hydroentangling. Methods of forming a nonwoven fabric including a first spunmelt TAB nonwoven layer are also provided.

16 Claims, 9 Drawing Sheets

(56) References Cited

U.S. PATENT DOCUMENTS

| | | | |
|---|---|---|---|
| 2012/0051672 A1* | 3/2012 | Foss | D04H 1/55 |
| | | | 383/105 |
| 2012/0329352 A1* | 12/2012 | Yoshida | D04H 1/435 |
| | | | 442/364 |
| 2015/0126949 A1* | 5/2015 | Ashraf | D04H 3/016 |
| | | | 604/372 |
| 2016/0067117 A1* | 3/2016 | Beckman | C09J 153/02 |
| | | | 604/366 |
| 2017/0016158 A1 | 1/2017 | Burgess et al. | |
| 2017/0196414 A1* | 7/2017 | Erlandsson | D04H 1/425 |
| 2017/0241054 A1* | 8/2017 | Song | D04H 3/11 |
| 2018/0216271 A1 | 8/2018 | Ashraf et al. | |

* cited by examiner

BIOPOLYMER-CONTAINING NONWOVEN FABRIC

CROSS-REFERENCE TO RELATED APPLICATIONS

This application claims priority under 35 U.S.C. § 119(e) to U.S. Provisional Application No. 62/910,630, filed Oct. 4, 2019, which is expressly incorporated by reference herein in its entirety.

TECHNICAL FIELD

Embodiments of the presently-disclosed invention relate generally to nonwoven fabrics including a first spunmelt through-air-bonded (TAB) nonwoven layer comprising a first plurality of spunmelt fibers, in which the first plurality of spunmelt fibers comprise a biopolymer. The first plurality of spunmelt fibers may be physically entangled with cellulosic fibers, such as by hydroentangling. Embodiments of the presently-disclosed invention also relate to methods of forming such nonwoven fabrics.

BACKGROUND

There is a trend to manufacture products from renewable resources. Aliphatic polyesters from renewable resources have found increasing application in materials because of their biodegradability and composability, such as poly(lactic acid) (PLA). Formation of nonwoven fabrics from such materials, however, may be challenging and resulting physical properties (e.g., tensile strength) of such materials often suffer in comparison to more traditional polyolefin-based materials, such as polypropylene-based nonwoven fabrics.

Therefore, there remains a desire in the art for nonwoven fabrics comprising a biopolymer (e.g., PLA) that exhibits improved physical properties, such as tensile strength per basis weight.

SUMMARY

One or more embodiments of the invention may address one or more of the aforementioned problems. Certain embodiments according to the invention provide nonwoven fabrics including a first spunmelt through-air-bonded (TAB) nonwoven layer comprising a first plurality of spunmelt fibers, in which the first plurality of spunmelt fibers comprise a biopolymer. The first plurality of spunmelt fibers may be physically entangled (e.g., via hydroentanglement) with fibers from one or more other nonwoven layers, such as a layer of cellulosic fibers.

In another aspect the present invention provides a method of forming a nonwoven fabric as disclosed and described herein. In accordance with certain embodiments of the invention, for instance, the method may comprise forming a spunmelt web of the first plurality of spunmelt fibers and consolidating the spunmelt web via a bonding process other than through-air-bonding, such as by thermal calendering, to provide an intermediate spunmelt nonwoven layer, or providing an intermediate spunmelt nonwoven layer, wherein the intermediate spunmelt nonwoven layer optionally comprises a plurality of discrete thermal bond sites. In accordance with certain embodiments of the invention, the method may comprise subjecting the intermediate spunmelt nonwoven layer to a through-air-bonding (TAB) operation to provide the nonwoven fabric. In accordance with certain embodiments of the invention, the method may further comprise physically entangling the first plurality of spunmelt fibers with a plurality of cellulosic fibers to form a composite nonwoven fabric subsequent to the TAB operation.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein:

FIG. 1A illustrates a cross-sectional view of a composite nonwoven fabric in accordance with certain embodiments of the invention;

FIG. 1B also illustrates a cross-sectional view of a composite nonwoven fabric in accordance with certain embodiments of the invention;

Figure 4:
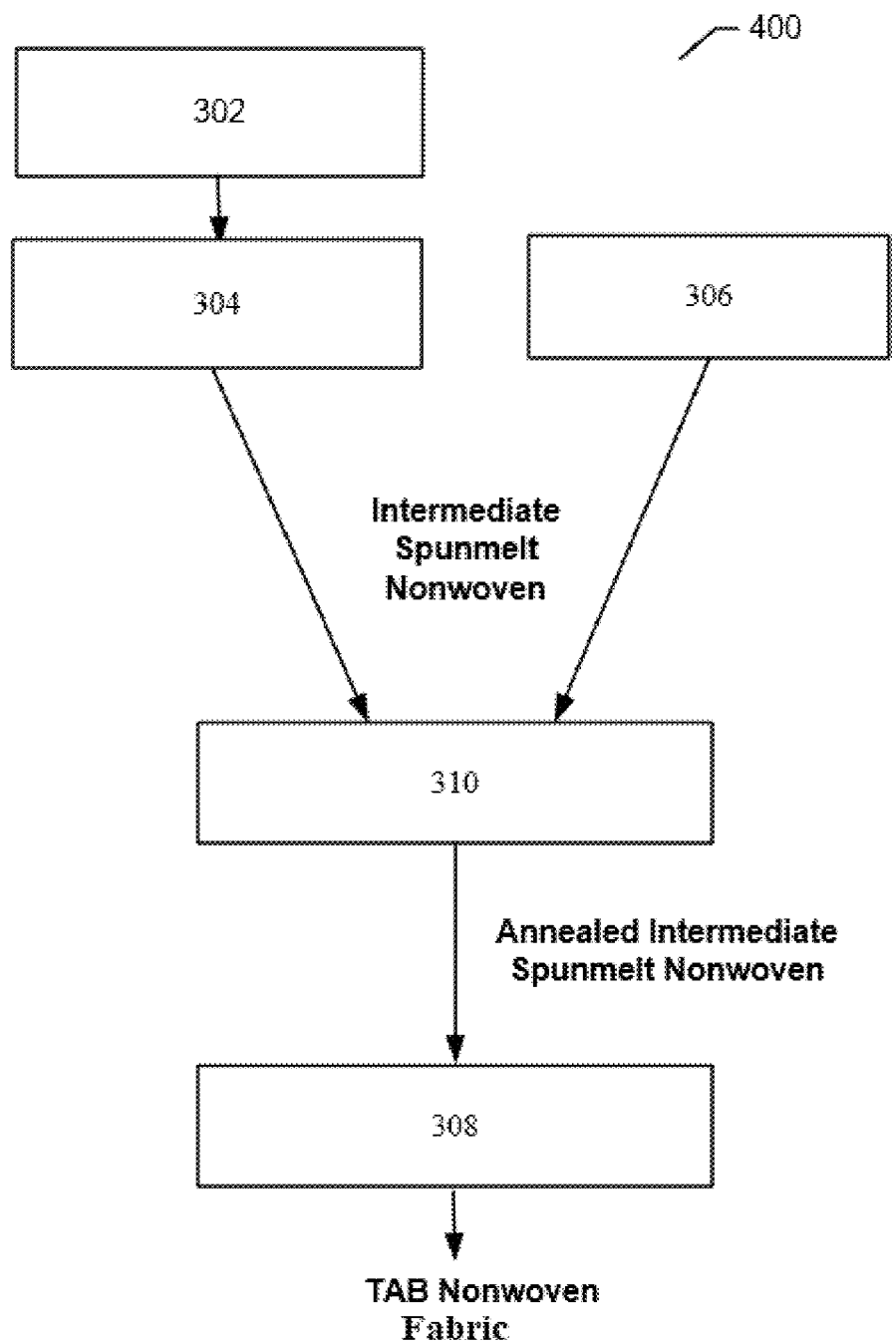
Figure 5:
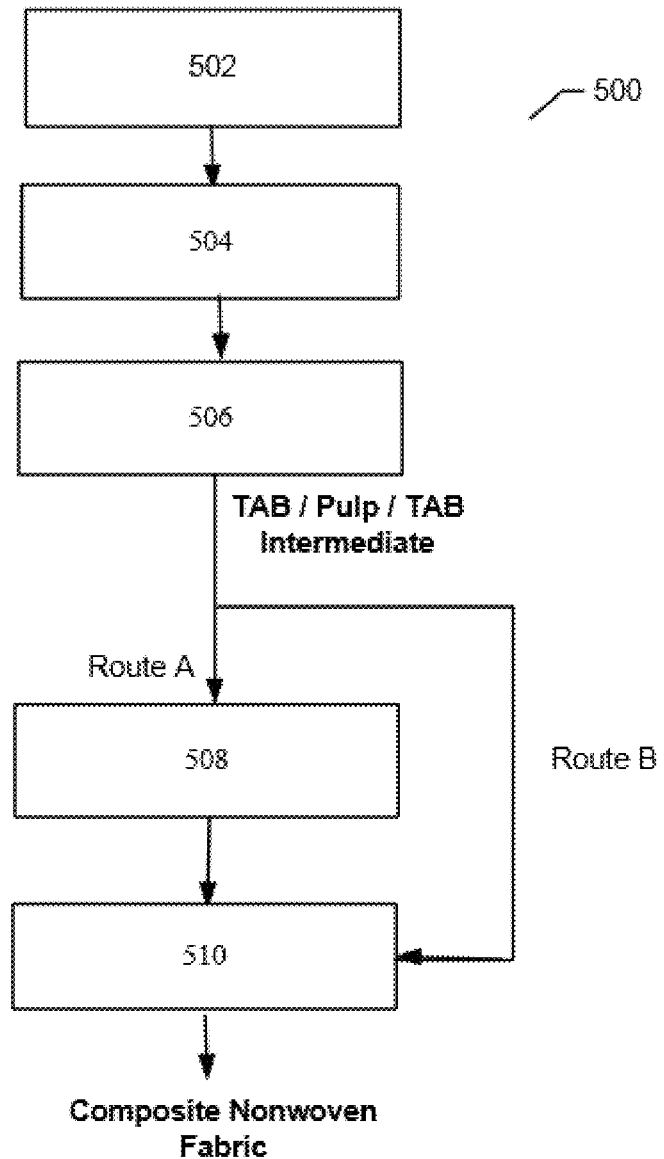
Figure 6:
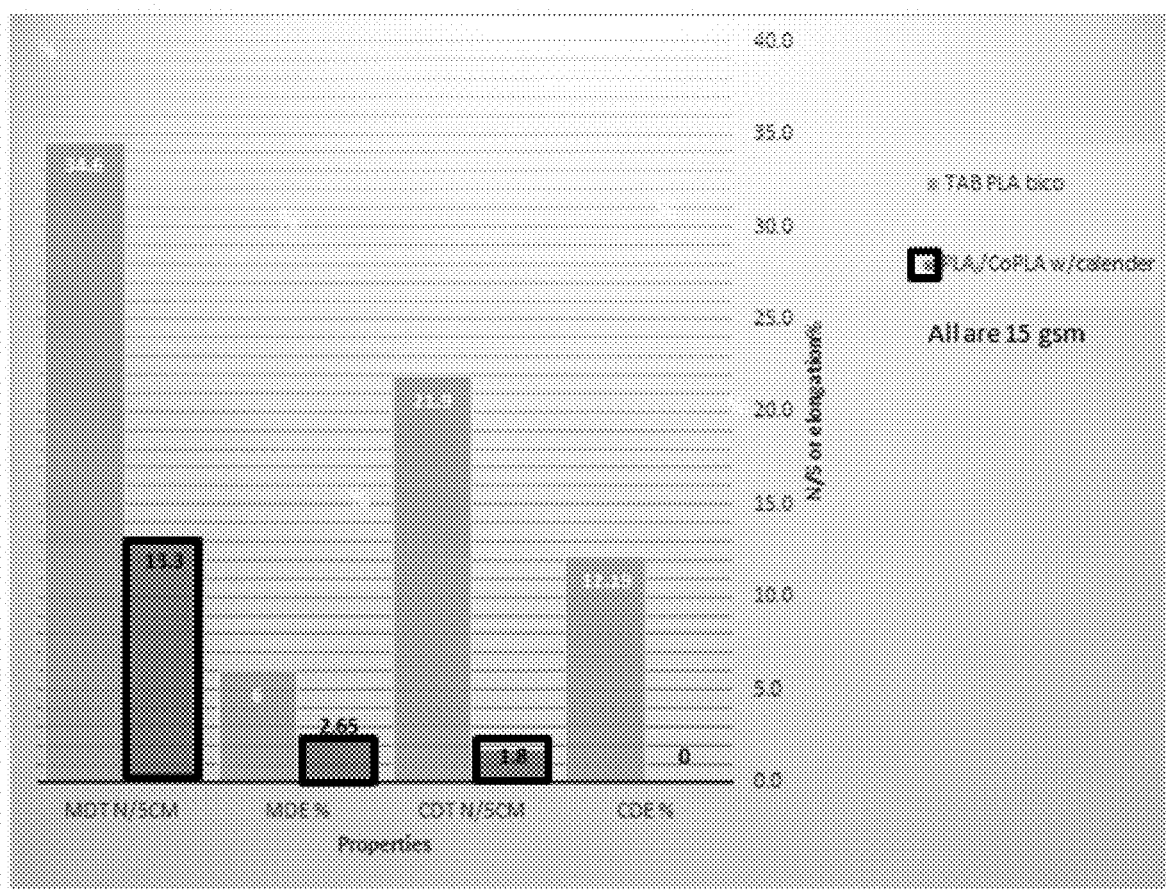

FIG. 4 also illustrates a block diagram of a method for forming a TAB nonwoven fabric in accordance with certain embodiments of the invention;

FIG. 5 illustrates a block diagram of a method for forming a composite nonwoven fabric in accordance with certain embodiments of the invention; and FIG. 6 shows a graph that compares physical properties for PLA-based spunbond nonwovens.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Figure 1A:
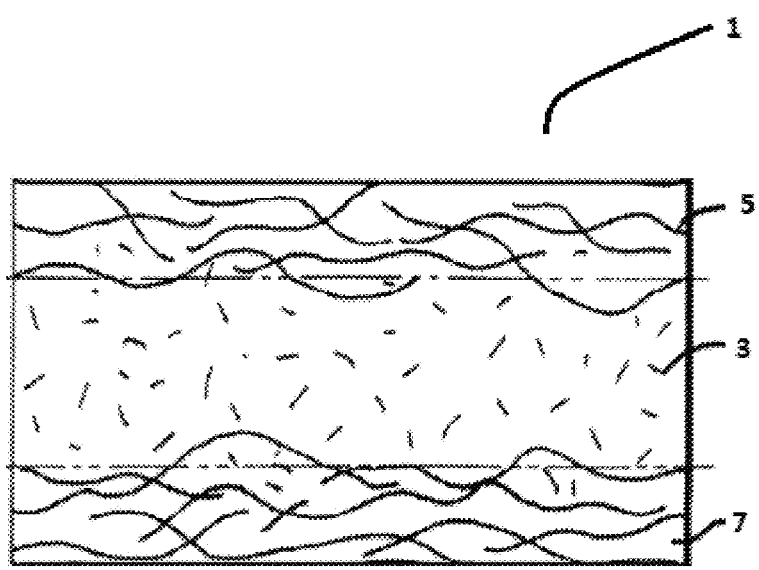
Figure 1B:
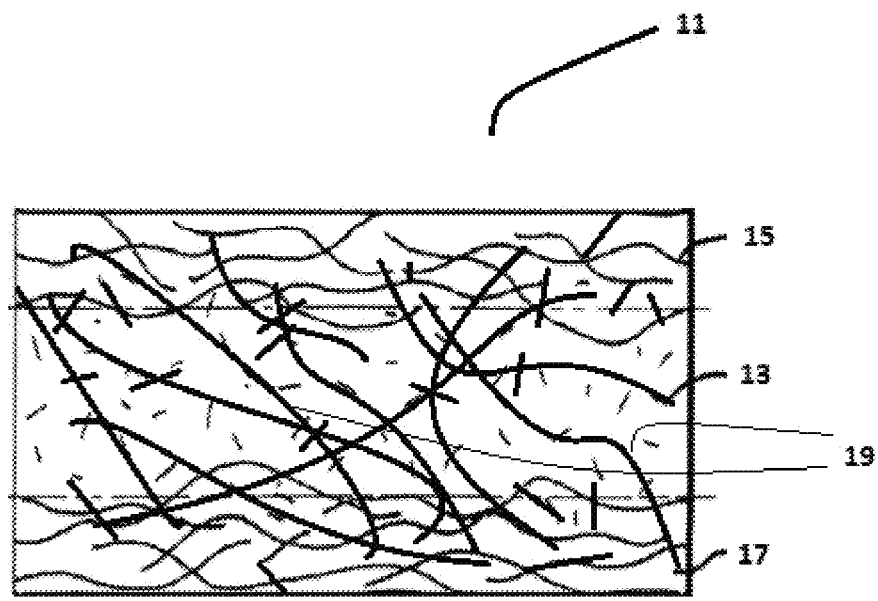

The presently-disclosed invention relates generally to nonwoven fabrics including one or more spunmelt through-air-bonded (TAB) nonwoven layers including a plurality of spunmelt fibers. In accordance with certain embodiments of the invention, for instance, the spunmelt TAB nonwoven layer or layers may individually comprise a biopolymer, such as poly(lactic acid) (PLA). The spunmelt TAB nonwoven layers can be provided alone or bonded to one or more additional nonwoven layers or film layers in accordance with certain embodiments of the invention. For example, the spunmelt TAB nonwoven layer(s) may be physically entangled with natural and/or synthetic fibers from an additional layer or web of fibers. For instance, the plurality of spunmelt fibers from one or more spunmelt TAB nonwoven layers may be physically entangled with cellulosic fibers, such as by hydroentanglement, to provide a composite nonwoven fabric, which may be suitable for a variety of applications (e.g., wet-wipe, dry-wipe, etc.). FIG. 1A, for example, illustrates a cross-sectional view of a composite nonwoven fabric 1 in accordance with certain embodiments of the invention, in which the composite nonwoven fabric 1 includes a layer of cellulosic fibers 3 (e.g., pulp) positioned between a first spunmelt TAB nonwoven layer 5 and a second spunmelt TAB nonwoven layer 7. As illustrated by FIG. 1A, fibers of the first spunmelt TAB nonwoven layer 5 may be physically entangled with the layer of cellulosic fibers 3, and the second spunmelt TAB nonwoven layer 7 may also be physically entangled with the layer of cellulosic fibers 3. FIG. 1A, for instance, may illustrate a composite nonwoven fabric subjected to relatively light physical entanglement operation (e.g., hydroentanglement). FIG. 1B, for example, illustrates a cross-sectional view of a composite nonwoven fabric 11 in accordance with certain embodiments of the invention, in which the composite nonwoven fabric 11 also includes a layer of cellulosic fibers 13 (e.g., pulp) positioned between a first spunmelt TAB nonwoven layer 15 and a second spunmelt TAB nonwoven layer 17. As illustrated by FIG. 1B, fibers of the first spunmelt TAB nonwoven layer 15 may be physically entangled with the layer of cellulosic fibers 13, and the second spunmelt TAB nonwoven layer 17 may also be physically entangled with the layer of cellulosic fibers 13. FIG. 1B also illustrates a plurality of spunmelt fibers 19 spanning nearly the entire thickness of the composite nonwoven fabric 11, including across the entire layer of cellulosic fibers 13 such that the spunmelt fibers 19 have an end in the first spunmelt TAB nonwoven layer 15 and another end in the second spunmelt TAB nonwoven layer 17. In this regard, fibers from the first spunmelt TAB nonwoven layer 15, fibers from the second spunmelt TAB nonwoven layer 17, and the cellulosic fibers 13 are all hydroentangled together to provide a more homogenous distribution of fibers across the thickness, or at least a partial thickness, of the composite nonwoven fabric 11. In accordance with certain embodiments of the invention and as shown in FIG. 1B, the concentration of the cellulosic fibers 13 may still be greatest at or near the middle of the thickness of the composite nonwoven fabric. In accordance with certain embodiments of the invention, the spunmelt TAB nonwoven layer(s) may comprise thermal bond sites, such as by thermal calendering, in addition to being physically entangled alone or with fibers from an additional layer of natural and/or synthetic fibers. In accordance with certain embodiments of the invention, the spunmelt TAB nonwoven layers may also comprise thermal bond sites (e.g., thermal point bonds) and such spunmelt TAB nonwoven layers have surprisingly large tensile strength and tensile strength-per-basis weight values. In accordance with certain embodiments of the invention, composite nonwoven fabrics formed from one or more of such spunmelt TAB nonwoven layers also have surprisingly large tensile strength and tensile strength-per-basis weight (TPBW) values.

The terms "substantial" or "substantially" may encompass the whole amount as specified, according to certain embodiments of the invention, or largely but not the whole amount specified (e.g., 95%, 96%, 97%, 98%, or 99% of the whole amount specified) according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in according to certain embodiments of the invention, polymers produced by fermentation process or biosourced.

The term "cellulosic fiber", as used herein, may comprise fibers including or formed from natural cellulose, regenerated cellulose, and/or combinations thereof. For example, a "cellulosic fiber" may be derived from hardwood trees, softwood trees, or a combination of hardwood and softwood trees prepared for use in, for example, a papermaking furnish and/or fluff pulp furnish by any known suitable digestion, refining, and bleaching operations. The cellulosic fibers may comprise recycled fibers and/or virgin fibers. Recycled fibers differ from virgin fibers in that the fibers have gone through the drying process at least once. In certain embodiments, at least a portion of the cellulosic fibers may be provided from non-woody herbaceous plants including, but not limited to, kenaf, cotton, hemp, jute, flax, sisal, or abaca. Cellulosic fibers may, in certain embodiments of the invention, comprise either bleached or unbleached pulp fiber such as high yield pulps and/or mechanical pulps such as thermo-mechanical pulping (TMP), chemical-mechanical pulp (CMP), and bleached chemical-thermo-mechanical pulp BCTMP. In this regard, the term "pulp", as used herein, may comprise cellulose that has been subjected to processing treatments, such as thermal, chemical, and/or mechanical treatments. Cellulosic fibers, according to certain embodiments of the invention, may comprise one or more pulp materials. In accordance with certain embodiments of the invention, the cellulosic fibers may comprise a rayon, such as viscose.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, needle-punching, hydroentangling, air-laid, and bonded carded web processes. A "nonwoven web", as used herein, may comprise a plurality of individual fibers that have not been subjected to a consolidating process.

The terms "fabric" and "nonwoven fabric", as used herein, may comprise a web of fibers in which a plurality of the fibers are mechanically entangled or interconnected, fused together, and/or chemically bonded together. For example, a nonwoven web of individually laid fibers may be subjected to a bonding or consolidation process to mechanically entangle, or otherwise bond, at least a portion of the individually fibers together to form a coherent (e.g., united) web of interconnected fibers.

The term "consolidated" and "consolidation", as used herein, may comprise the bringing together of at least a portion of the fibers of a nonwoven web into closer proximity or attachment there-between (e.g., thermally fused together, chemically bonded together, and/or mechanically entangled together) to form a bonding site, or bonding sites, which function to increase the resistance to external forces (e.g., abrasion and tensile forces), as compared to the unconsolidated web. The bonding site or bonding sites, for example, may comprise a discrete or localized region of the web material that has been softened or melted and optionally subsequently or simultaneously compressed to form a discrete or localized deformation in the web material. Furthermore, the term "consolidated" may comprise an entire nonwoven web that has been processed such that at least a portion of the fibers are brought into closer proximity or attachment there-between (e.g., thermally fused together, chemically bonded together, and/or mechanically entangled together), such as by thermal bonding or mechanical entanglement (e.g., hydroentanglement) as merely a few examples. Such a web may be considered a "consolidated nonwoven", "nonwoven fabric" or simply as a "fabric" according to certain embodiments of the invention.

The term "staple fiber", as used herein, may comprise a cut fiber from a filament. In accordance with certain embodiments, any type of filament material may be used to form staple fibers. For example, staple fibers may be formed from polymeric fibers, and/or elastomeric fibers. Non-limiting examples of materials may comprise polyolefins (e.g., a polypropylene or polypropylene-containing copolymer), polyethylene terephthalate, and polyamides. The average length of staple fibers may comprise, by way of example only, from about 2 centimeter to about 15 centimeter.

The term "layer", as used herein, may comprise a generally recognizable combination of similar material types and/or functions existing in the X-Y plane.

The term "multi-component fibers", as used herein, may comprise fibers formed from at least two different polymeric materials or compositions (e.g., two or more) extruded from separate extruders but spun together to form one fiber. The term "bi-component fibers", as used herein, may comprise fibers formed from two different polymeric materials or compositions extruded from separate extruders but spun together to form one fiber. The polymeric materials or polymers are arranged in a substantially constant position in distinct zones across the cross-section of the multi-component fibers and extend continuously along the length of the multi-component fibers. The configuration of such a multi-component fiber may be, for example, a sheath/core arrangement wherein one polymer is surrounded by another, an eccentric sheath/core arrangement, a side-by-side arrangement, a pie arrangement, or an "islands-in-the-sea" arrangement, each as is known in the art of multicomponent, including bicomponent, fibers.

The term "machine direction" or "MD", as used herein, comprises the direction in which the fabric produced or conveyed. The term "cross-direction" or "CD", as used herein, comprises the direction of the fabric substantially perpendicular to the MD.

The term "crimp" or "crimped", as used herein, comprises a three-dimensional curl or bend such as, for example, a folded or compressed portion having an "L" configuration, a wave portion having a "zig-zag" configuration, or a curl portion such as a helical configuration. In accordance with certain embodiments of the invention, the term "crimp" or "crimped" does not include random two-dimensional waves or undulations in a fiber, such as those associated with normal lay-down of fibers in a melt-spinning process.

As used herein, the term "continuous fibers" refers to fibers which are not cut from their original length prior to being formed into a nonwoven web or nonwoven fabric. Continuous fibers may have average lengths ranging from greater than about 15 centimeters to more than one meter, and up to the length of the web or fabric being formed. For example, a continuous fiber, as used herein, may comprise a fiber in which the length of the fiber is at least 1,000 times larger than the average diameter of the fiber, such as the length of the fiber being at least about 5,000, 10,000, 50,000, or 100,000 times larger than the average diameter of the fiber.

As used herein, the term "aspect ratio", comprise a ratio of the length of the major axis to the length of the minor axis of the cross-section of the fiber in question.

As used herein, the term "spunmelt" refers to a generic manufacturing process of nonwoven webs from thermoplastic polymers, and includes spunbonding processes and meltblowing processes. In this regard, "spunmelt fibers" as used herein may comprise spunbond fibers and/or meltblown fibers.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous as disclosed and described herein. It is noted that the spunbond used in certain composites of the invention may include a nonwoven described in the literature as SPINLACE®.

The term "meltblown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers may comprise microfibers which may be continuous or discontinuous and are generally tacky when deposited onto a collecting surface. Meltblown fibers, however, are shorter in length than those of spunbond fibers.

The term "through-air bonded", as used herein, may comprise a nonwoven web consolidated by a bonding process in which hot air is used to fuse the fibers at the surface of the web and optionally internally within the web. By way of example only, hot air can either be blown through the web in a conveyorized oven or sucked through the web as it passes over a porous drum as a vacuum is developed. The temperature of the hot air and the rate of hot air are parameters that may determine the level or the extent of bonding in nonwoven web. In accordance with certain embodiments of the invention, the temperature of the hot air may be high enough to melt and/or fuse a first polymeric component (e.g., a sheath component) of a multicomponent fiber (e.g., bicomponent fiber) while not melting a second polymeric component (e.g., a sheath component) of the multicomponent fiber. In accordance with certain embodiments of the invention, the hot air may also initiate crimping of multicomponent fibers (e.g., bicomponent fibers).

All whole number end points disclosed herein that can create a smaller range within a given range disclosed herein are within the scope of certain embodiments of the invention. By way of example, a disclosure of from about 10 to about 15 includes the disclosure of intermediate ranges, for example, of: from about 10 to about 11; from about 10 to about 12; from about 13 to about 15; from about 14 to about 15; etc. Moreover, all single decimal (e.g., numbers reported to the nearest tenth) end points that can create a smaller range within a given range disclosed herein are within the scope of certain embodiments of the invention. By way of example, a disclosure of from about 1.5 to about 2.0 includes the disclosure of intermediate ranges, for example, of: from about 1.5 to about 1.6; from about 1.5 to about 1.7; from about 1.7 to about 1.8; etc.

In one aspect, the invention provides nonwoven fabrics including a first spunmelt TAB nonwoven layer comprising a first plurality of spunmelt fibers, in which the first plurality of spunmelt fibers comprise a biopolymer. The first spunmelt TAB nonwoven layer, for instance, may comprise a spunbond layer comprising spunbond fibers, a meltblown layer comprising meltblown fibers, or a blend of both spunbond and meltblown fibers. In accordance with certain embodiments of the invention, the first spunmelt TAB nonwoven layer may comprise one or more additives disposed therein (e.g., within the melt used for forming the spunmelt fibers and/or intermixed macroscopically with the plurality of spunmelt fibers). For example, the first spunmelt TAB nonwoven layer may comprise abrasive particulates (e.g., particles of calcium carbonate), cellulosic fibers, and/or staple fibers intermixed with the first plurality of spunmelt fibers, such as via a co-forming operation in which the additive may be intermixed with the first plurality of spunmelt fibers upon being deposited onto a collection web or belt prior to consolidation.

The biopolymer, by way of example only, may comprise a poly(lactic) acid (PLA), polyhydroxyalkanoates (PHA), a poly(hydroxycarboxylic) acids, or any combination thereof. For example, the spunmelt fibers may comprise a blend of two or more biopolymers that form all of the spunmelt fibers (e.g., mono-component fibers) or a component of the spunmelt fibers (e.g., one or more components or phases of a multi-component fibers). In accordance with certain embodiments, the spunmelt fibers may comprise a blend or mixture of one or more biopolymers and optionally one or more synthetic polymer (e.g. a polyolefin). In accordance with certain embodiments of the invention, the first plurality of spunmelt fibers may comprise from about 30 to 100% by weight of the biopolymer, such as at most about any of the following: 100, 90, 80, 70, 60, and 50% by weight of the biopolymer and/or at least about any of the following: 30, 40, 50, and 60% by weight of the biopolymer.

In accordance with certain embodiments of the invention, the first plurality of spunmelt fibers may be physically entangled (e.g., via hydroentanglement) with fibers from one or more other nonwoven layers, such as a layer of cellulosic fibers, as generally illustrated by FIGS. 1A and 1B. Additionally or alternatively, the first spunmelt TAB nonwoven layer may be directly or indirectly bonded to another nonwoven layer, nonwoven web (e.g. unconsolidated group of loose fibers), or film layer. In accordance with certain embodiments of the invention, the first plurality of spunmelt fibers may also (e.g., in addition to any bonding realized from the TAB operation) comprise a first plurality of discrete first bond sites, such as thermal bonds. In this regard, the first plurality of spunmelt fibers may be pre-consolidated by means of a thermal bonding operation prior to being subjected to a TAB operation. In this regard, the first plurality of spunmelt fibers may comprise bonding sites associated with a thermal bonding operation (e.g., thermal calendering) and a TAB operation. In accordance with certain embodiments of the invention, for example, the first spunmelt TAB nonwoven layer may comprise a first bonded area defined by thermal bonds, such as thermal point bonds. The first bonded area, for example, may comprise from about 3% to about 30% by area, such as at most about any of the following: 30, 25, 20, 15, 12, and 10% by area and/or at least about any of the following: 3, 5, 8, 10, 12, and 15% by area. In accordance with certain embodiments of the invention, the first plurality of discrete first bond sites may comprise an average distance between adjacent bond sites from about 1 mm to about 10 mm, such as at most about any of the following: 10, 9, 8, 7, 6, 5, 4, 3.5, 3, and 2 mm and/or at least about any of the following: 1, 1.5, 2, 2.5, and 3 mm. Additionally or alternatively, the first plurality of discrete first bond sites may comprise an average area from about 0.25 $mm^2$ to about 3 $mm^2$, such as at most about any of the following: 3, 2.5, 2.25, 2, 1.75, 1.5, 1.25, 1, and 0.75 $mm^2$ and/or at least about any of the following: 0.25, 0.3, 0.4, 0.5, 0.6, 0.7, 0.75, 0.8, 0.9, 1, and 1.25 $mm^2$.

The first plurality of spunmelt fibers may comprise a variety of cross-sectional geometries and/or deniers, such as round or non-round cross-sectional geometries. In accordance with certain embodiments of the invention, a plurality of first plurality of spunmelt fibers may comprise all or substantially all of the same cross-sectional geometry or a mixture of differing cross-sectional geometries to tune or control various physical properties. In this regard, the first plurality of spunmelt fibers may comprise a round cross-section, a non-round cross-section, or combinations thereof. In accordance with certain embodiments of the invention, for example, the first plurality of spunmelt fibers may comprise from about 10% to about 100% of round cross-sectional fibers, such as at most about any of the following: 100, 95, 90, 85, 75, and 50% and/or at least about any of the following: 10, 20, 25, 35, 50, and 75%. Additionally or alternatively, the first plurality of spunmelt fibers may comprise from about 10% to about 100% of non-round cross-sectional fibers, such as at most about any of the following: 100, 95, 90, 85, 75, and 50% and/or at least about any of the following: 10, 20, 25, 35, 50, and 75%. In accordance with embodiments of the invention including non-round cross-sectional spunmelt fibers, these non-round cross-sectional spunmelt fibers may comprise an aspect ratio of greater than 1.5:1, such as at most about any of the following: 10:1, 9:1, 8:1, 7:1, 6:1, 5:1, 4:1, 3:1, and 2:1 and/or at least about any of the following: 1.5:1, 2:1, 2.5:1, 3:1, 4:1, 5:1, and 6:1. In accordance with certain embodiments of the invention, the aspect ratio, as used herein, may comprise a ratio of the length of the major axis to the length of the minor axis of the cross-section of the fiber in question.

In accordance with certain embodiments of the invention, the first plurality of spunmelt fibers may comprise a sheath/core configuration, a side-by-side configuration, a pie configuration, an islands-in-the-sea configuration, a multi-lobed configuration, or any combinations thereof. In accordance with certain embodiments of the invention, the sheath/core configuration may comprise an eccentric sheath/core configuration (e.g., bi-component fiber) including a sheath component and core component that is not concentrically located within the sheath component. The core component, for example, may define at least a portion of an outer surface of the spunmelt fiber having the eccentric sheath/core configuration in accordance with certain embodiments of the invention.

Figure 2A:
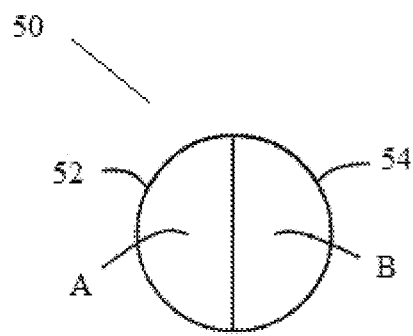
FIG. 2A-2H illustrate examples of cross-sectional views for some example multi-component fibers in accordance with certain embodiments of the invention.
Figure 2B:
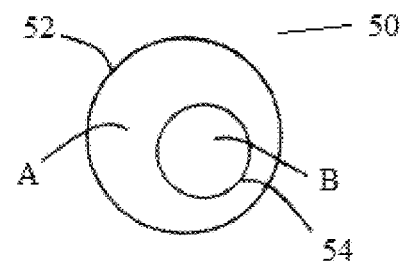
Figure 2C:
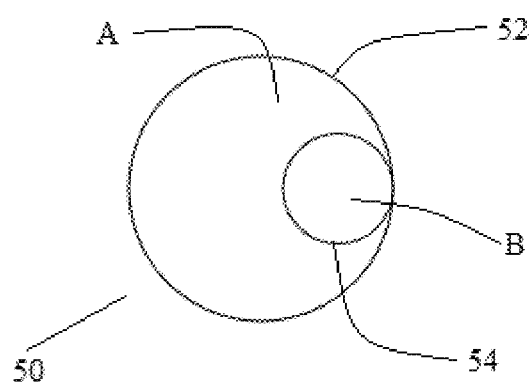
Figure 2D:
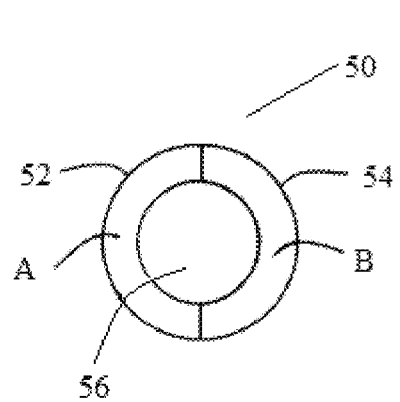
Figure 2E:
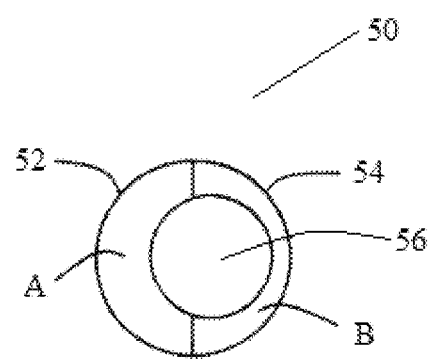
Figure 2F:
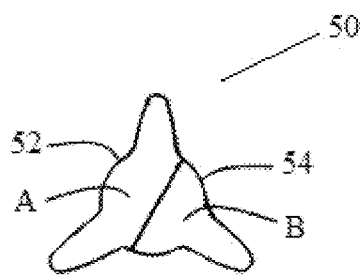
Figure 2G:
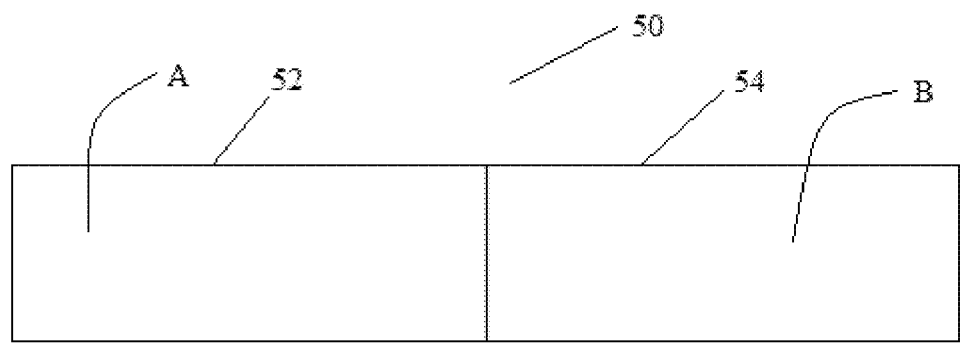
Figure 2H:
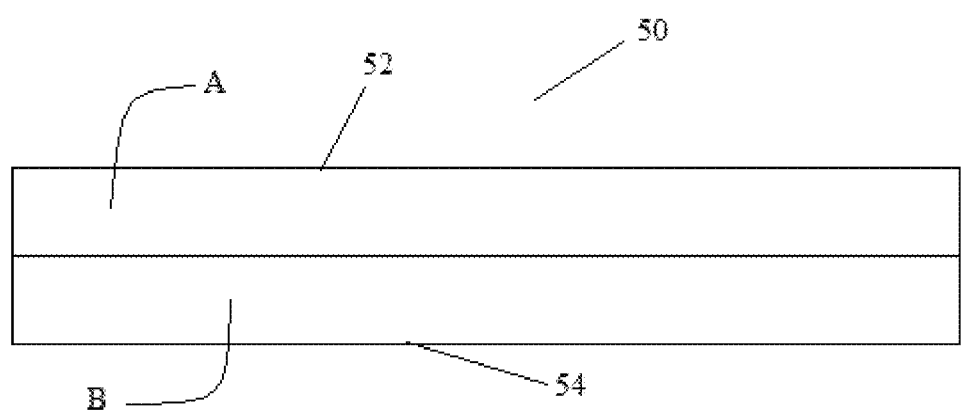

FIGS. 2A-2H illustrate examples of cross-sectional views for some non-limiting examples of spunmelt fibers in accordance with certain embodiments of the invention. As illustrated in FIG. 2A-2H, the spunmelt fiber 50 may comprise a first biopolymer component 52 of a first biopolymer composition A and a second biopolymer component 54 of a second biopolymer composition B. The first and second components 52 and 54 can be arranged in substantially distinct zones within the cross-section of the spunmelt fiber that extend substantially continuously along the length of the spunmelt fiber. The first and second components 52 and 54 can be arranged in a side-by-side arrangement in a round cross-sectional fiber as depicted in FIG. 2A or in a ribbon-shaped (e.g., non-round) cross-sectional fiber as depicted in FIGS. 2G and 2H. Additionally or alternatively, the first and second components 52 and 54 can be arranged in a sheath/core arrangement, such as an eccentric sheath/core arrangement as depicted in FIGS. 2B and 2C. In the eccentric sheath/core spunmelt fibers as illustrated in FIG. 2B, one component fully occludes or surrounds the other but is asymmetrically located in the spunmelt fiber to allow fiber crimp (e.g., first component 52 surrounds component 54) if desired. Eccentric sheath/core configurations as illustrated by FIG. 2C include the first component 52 (e.g., the sheath component) substantially surrounding the second component 54 (e.g., the core component) but not completely as a portion of the second component may be exposed and form part of the outermost surface of the spunmelt fiber 50. As additional examples, the spunmelt fibers can comprise hollow fibers as shown in FIGS. 2D and 2E or as multilobal fibers as shown in FIG. 2F. It should be noted, however, that numerous other cross-sectional configurations and/or fiber shapes may be suitable in accordance with certain embodiments of the invention. In the multi-component fibers, in accordance with certain embodiments of the invention, the respective biopolymer components can be present in ratios (by volume or by mass) of from about 85:15 to about 15:85. Ratios of approximately 50:50 (by volume or mass) may be desirable in accordance with certain embodiments of the invention; however, the particular ratios employed can vary as desired, such as at most about any of the following: 85:15, 80:20, 75:25, 70:30, 65:35, 60:40, 55:45 and 50:50 by volume or mass and/or at least about any of the following: 50:50, 45:55, 40:60, 35:65, 30:70, 25:75, 20:80, and 15:85 by volume or mass.

In accordance with certain embodiments of the invention, for example, the first plurality of spunmelt fibers may comprise a bi-component fiber comprising a core component including a first biopolymer or first biopolymer composition and a sheath component including a second biopolymer or second biopolymer composition. In this regard, the first biopolymer or first biopolymer composition has a first melting temperature and the second biopolymer or second biopolymer composition has a second melting temperature, in which the first melting temperature is larger than the second melting temperature. For instance, the second melting temperature may be from about 5° C. to about 50° C. less than the first melting temperature as determined in accordance with ASTM D3418, such as at most about any of the following: 50, 45, 40, 35, 30, 25, 20, 15, and 10° C. less than the first melting temperature and/or at least about any of the following: 5, 10, 15, and 20° C. less than the first melting temperature. Additionally or alternatively, the first biopolymer or first biopolymer composition has a first melt index and the second biopolymer or second biopolymer composition has a second melt index; in which the first melt index is larger than the second melt index. For example, the second melt index may be from about 3 g/10 min to about 30 g/10 min smaller than the first melt index as determined in accordance with ASTM D1238 (g/10 min at 210° C.), such as at most about any of the following: 30, 28, 26, 24, 22, 20, 18, 16, 14, 12, 10, 9, and 8 g/10 min smaller than the first melt index and/or at least about any of the following: 3, 4, 5, 6, 7, 8, 9, and 10 g/10 min smaller than the first melt index. In accordance with certain embodiments of the invention, the sheath component may comprise an at least partially deformed configuration associated with the softening, at least partial flowing, and re-solidification into the at least partially deformed configuration wherein a thickness of the sheath component in the at least partially deformed configuration varies. In accordance with certain embodiments of the invention, the first biopolymer or first biopolymer composition may comprise a first PLA or first PLA composition and the second biopolymer or biopolymer composition may comprise a second PLA or second PLA composition.

In accordance with certain embodiments of the invention, the first spunmelt TAB nonwoven layer may be directly or indirectly bonded to a second nonwoven layer. For example, the second nonwoven layer may comprise one or more of an additional biopolymer or biopolymer composition and/or one or more synthetic polymer. In accordance with certain embodiments of the invention, the second nonwoven layer may comprise one or more spunbond layers, one or more meltblown layers, one or more carded nonwoven layers, one or more mechanically bonded nonwoven layers, or any combination thereof. Additionally or alternatively, the nonwoven fabric may comprise a composite nonwoven fabric comprising a plurality of cellulosic fibers physically entangled with the first plurality of spunmelt fibers. In accordance with certain embodiments of the invention, the second nonwoven layer (if present) may optionally be physically entangled with the cellulosic fibers and/or the first plurality of spunmelt fibers. In accordance with certain embodiments of the invention, the first spunmelt TAB nonwoven layer may be directly or indirectly bonded to a second spunmelt TAB nonwoven layer, in which the second spunmelt TAB nonwoven layer comprises a second plurality of spunmelt fibers comprising a different of identical biopolymer or biopolymer composition as the first plurality of spunmelt fibers.

In accordance with certain embodiments of the invention, the nonwoven fabric comprises a composite nonwoven fabric comprising the first spunmelt TAB nonwoven layer, a second spunmelt TAB nonwoven layer comprising a second plurality of spunmelt fibers, in which the second plurality of spunmelt fibers may be the same or different than the first plurality of spunmelt fibers, and cellulosic fibers. In accordance with certain embodiments of the invention, the first plurality of spunmelt fibers may be physically entangled with the cellulosic fibers, and the second plurality of spunmelt fibers may be physically entangled with the cellulose fibers. In accordance with certain embodiments of the invention, the first plurality of spunmelt fibers, the cellulosic fibers, and the second plurality of spunmelt fibers are physically entangled with each other. In accordance with certain embodiments of the invention, the composite nonwoven fabric includes a first outer surface, a second outer surface, and an interior region including a mid-point between the first outer surface and the second outer surface in a z-direction that is perpendicular to a x-y plane, in which a first concentration of the cellulosic fibers at the first outer surface and/or the second outer surface is less than a second concentration of the plurality of the cellulosic fibers at the mid-point. For instance, at least a majority (e.g., more than 50% by number) of the cellulosic fibers reside in the interior region, such at least about 60%, 70%, or 80% by number.

In accordance with certain embodiments of the invention, the composite nonwoven fabric comprises from about 10% by weight to about 90% by weight of the cellulosic fibers, such as at most about any of the following: 90, 80, 70, 60, 50, 40, and 30% by weight and/or at least about any of the following: 10, 15, 20, 25, 30, 35, 40, 45, and 50% by weight. Additionally or alternatively, the composite nonwoven fabric comprises from about 10% by weight to about 90% by weight of the biopolymer, such as at most about any of the following: 90, 80, 70, 60, 50, 40, and 30% by weight and/or at least about any of the following: 10, 15, 20, 25, 30, 35, 40, 45, and 50% by weight.

In accordance with certain embodiments of the invention, the nonwoven fabric (e.g., as a composite nonwoven fabric or not) may have a basis weight from about 10 grams-per-square-meter (gsm) to about 120 gsm, such as at most about any of the following: 120, 110, 100, 90, 80, 70, 60, 50, 40, 30 and 20 gsm and/or at least about any of the following: 10, 15, 20, 25, 30, 35, 40, 45, and 50 gsm. In accordance with certain embodiments of the invention, the nonwoven fabric (e.g., as a composite nonwoven fabric or not) may have a MD tensile strength (dry or wet) per basis weight value from about 0.07 lb/gsm to about 0.25 lb/gsm where the tensile strength is measured according to ASTM D5035, such as at most about any of the following: 0.25, 0.22, 0.20, 0.18, 0.16, 0.15, 0.14, 0.12, and 0.1 lb/gsm and/or at least about any of the following: 0.07, 0.075, 0.8, 0.85, 0.9, 0.95, and 0.1 lb/gsm where the tensile strength is measured according to ASTM D5035. In accordance with certain embodiments of the invention, the nonwoven fabric (e.g., as a composite nonwoven fabric or not) may have a CD tensile strength (dry or wet) per basis weight value from about 0.05 lb/gsm to about 0.15 lb/gsm where the tensile strength is measured according to ASTM D5035, such as at most about any of the following: 0.15, 0.12, 0.10, 0.08, 0.06, and 0.05 lb/gsm and/or at least about any of the following: 0.05, 0.055, 0.06, 0.065, 0.07, and 0.075 lb/gsm where the tensile strength is measured according to ASTM D5035.

In accordance with certain embodiments of the invention, the first plurality of spunmelt fibers may comprise a plurality of crimped spunmelt fibers. For example, the first plurality of crimped spunmelt fibers may include one or more three-dimensional crimped portions including at least one discrete zig-zag configured crimped portion, at least one discrete helically configured crimped portion, or a combination thereof.

In accordance with certain embodiments of the invention, the nonwoven fabric (e.g., as a composite nonwoven fabric or not) may include a three-dimensional image imparted into at least a first surface of the nonwoven fabric, in which the three-dimensional image includes at least one recessed portion and at least one projecting portion.

Figure 3:
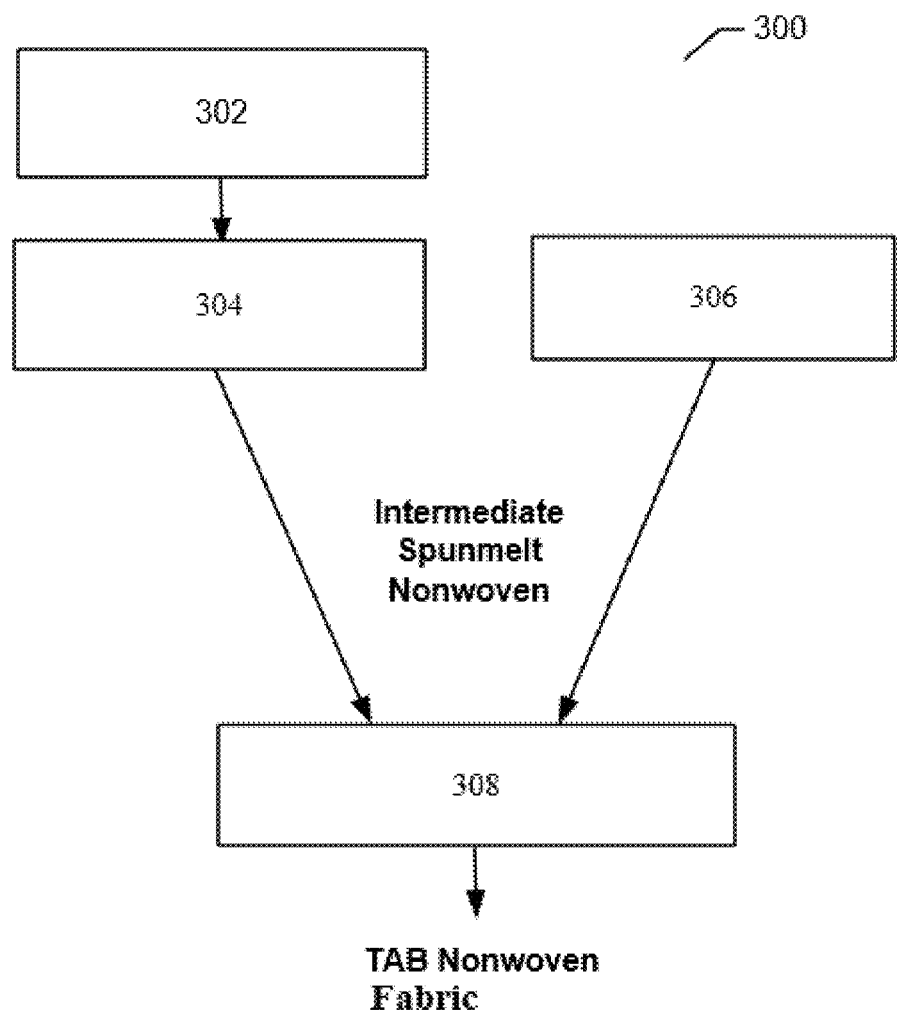
FIG. 3 illustrates a block diagram of a method for forming a TAB nonwoven fabric in accordance with certain embodiments of the invention.

In yet another aspect, the presently-disclosed invention provides a method of forming a TAB nonwoven fabric as disclosed and described herein. In accordance with certain embodiments of the invention, for instance, the method 300 as illustrated in FIG. 3 may comprise forming a spunmelt web of the first plurality of spunmelt fibers at operation 302 and consolidating the spunmelt web via a bonding process other than through-air-bonding at operation 304, such as by thermal calendering, to provide an intermediate spunmelt nonwoven layer, or providing an intermediate spunmelt nonwoven layer at operation 306, wherein the intermediate spunmelt nonwoven layer optionally comprises a plurality of discrete thermal bond sites. In accordance with certain embodiments of the invention, the method may comprise subjecting the intermediate spunmelt nonwoven layer to a TAB operation at operation 308 to provide the TAB nonwoven fabric.

In accordance with certain embodiments of the invention, the TAB operation may comprise subjecting the intermediate spunmelt nonwoven layer to a temperature sufficiently high enough to soften at least a portion of the first plurality of spunmelt fibers, and optionally sufficiently high enough to induce flowing of at least of portion of the first plurality of spunmelt fibers (e.g., slightly deform the original cross-sectional geometry of at least some of the spunmelt fibers). For example, a temperature sufficiently high enough to soften at least a portion of the first plurality of spunmelt fibers may comprise a temperature value that is at least about 3° C. larger than a lowest melting point of at least a portion of the first plurality of spunmelt fibers, such as at most about any of the following: 50, 45, 40, 35, 30, 25, 20, 15, and 10° C. larger than the lowest melting point of at least a portion of the first plurality of spunmelt fibers and/or at least about any of the following: 3, 5, 10, 15, and 20° C. larger than the lowest melting point of at least a portion of the first plurality of spunmelt fibers. In accordance with certain embodiments of the invention, the first plurality of spunmelt fibers may comprise bi-component fibers comprising a core component including a first biopolymer or first biopolymer composition and a sheath component including a second biopolymer or a second biopolymer composition, in which the first biopolymer or first biopolymer composition has a first melting temperature and the second biopolymer or second biopolymer composition has a second melting temperature, and the first melting temperature is larger than the second melting temperature. In this regard, the temperature value that is sufficiently high enough to soften and/or induce flow/deformation to at least a portion of the first plurality of spunmelt fibers may be larger than the second melting temperature and smaller than the first melting temperature. Additionally or alternatively, the TAB operation may comprise subjecting the intermediate spunmelt nonwoven layer to a temperature sufficiently high enough to soften at least a portion of the first plurality of spunmelt fibers for a dwell time from about 2 seconds to about 120 seconds, such as at most about any of the following: 120, 100, 80, 60, 40, 20, 15, 10, and 5 seconds and/or at least about any of the following: 2, 3, 4, 5, 10, 15, and 20 seconds.

FIG. 4 also illustrates a method for forming a TAB nonwoven fabric in accordance with certain embodiments of the invention, in which the method includes subjecting the intermediate spunmelt nonwoven to an annealing operation 310 prior the operation 308 (i.e., the TAB operation). In accordance with certain embodiments of the invention, the intermediate spunmelt nonwoven may be subjected to an annealing operation (e.g., thermal annealing) in which the intermediate spunmelt nonwoven is heat treated by raising the temperature of the intermediate spunmelt nonwoven to within (but not at or exceeding) about 7° C. (e.g., 3, 4, 5, 6, 7, 8, 9, or 10° C.) below the highest melting point component (e.g., a core component having a higher melting point than a sheath component) while the intermediate spunmelt nonwoven may be under physical constraint (e.g., between two belts, or belt and drum, or stenter type constraint). In accordance with certain embodiments of the invention, prior to releasing the intermediate spunmelt nonwoven from the constraint, the temperature of the intermediate spunmelt nonwoven may be reduced to about 30° C. (e.g., from about 20° C. to about 35° C.) to complete the annealing step.

In accordance with certain embodiments of the invention, the intermediate spunmelt nonwoven may be subjected to the annealing operation under conditions sufficient to merely increase the tackiness of the lower melt spunmelt fibers to promote inter-adhesion amongst the spunmelt fibers as the intermediate spunmelt nonwoven enters the TAB operation to reduce shrinkage that may ordinarily be associated with TAB operations.

In accordance with certain embodiments of the invention, the method may further comprise physically entangling the first plurality of spunmelt fibers with a plurality of cellulosic fibers to form a nonwoven composite fabric subsequent to the TAB operation. In this regard, the nonwoven fabric may comprise a composite nonwoven fabric, in which the method may further comprise depositing at least one layer of cellulosic fibers onto the first plurality of spunmelt fibers after subjecting the intermediate spunmelt nonwoven layer to the TAB operation and physically entangling the first plurality of spunmelt fibers and the cellulosic fibers. In accordance with certain embodiments of the invention, the method may further comprise positioning at least one layer of cellulosic fibers between the first plurality of spunmelt fibers and a second plurality of spunmelt fibers after subjecting the intermediate spunmelt nonwoven layers (e.g., a first spunmelt TAB nonwoven layer and a second spunmelt TAB nonwoven layer) to a TAB operation, and physically entangling the first plurality of spunmelt fibers, the cellulosic fibers, and the second plurality of spunmelt fibers.

FIG. 5, for example, illustrates a method for forming a composite nonwoven fabric in accordance with certain embodiments of the invention. As shown in FIG. 5, the method 500 may comprise (i) forming or providing a first spunmelt TAB nonwoven layer at operation 502, (ii) depositing at least one layer comprising cellulosic fibers directly or indirectly onto the first spunmelt TAB nonwoven layer at operation 504, and (iii) depositing a second spunmelt TAB nonwoven layer directly or indirectly onto the at least one layer comprising cellulosic fibers at operation 506 to provide a TAB/Pulp/TAB structured intermediate. The TAB/Pulp/TAB structured intermediate exiting operation 506 may proceed along one of two routes for further processing. FIG. 5 illustrates the first route as Route A, in which the TAB/Pulp/TAB structured intermediate exiting operation 506 proceeds to a physical entangling operation at operation 508, such as a hydroentanglement operation in which one or both sides of the TAB/Pulp/TAB structured intermediate may be subjected to physical entanglement. Operation 508 may provide a varying degree of physical entanglement. The physically entangled material may then be subjected to an optional imaging operation at operation 510 to provide a composite nonwoven fabric including a 3D image on at least one side thereof. The imaging operation, for example may comprise imparting a three-dimensional (3D) image onto at least one outermost surface of the composite nonwoven fabric, wherein the 3D image has at least one recessed portion and at least one projecting portion. FIG. 5 illustrates the second route as Route B, in which the TAB/Pulp/TAB structured intermediate exiting operation 506 proceeds directly to the imaging operation 510. In this regard, the imaging operation 510 may not only impart a 3D image but also physically entangle (e.g., hydroentanglement) the fibers of each of the TAB/Pulp/TAB structured intermediate to provide the composite nonwoven fabric.

In accordance with certain embodiments of the invention, the method may further comprise (a) providing a three-dimensional image transfer device having an imaging surface, (b) supporting a first outermost surface of the TAB/Pulp/TAB structured intermediate (whether pre-consolidated at operation 508 or not) on the imaging surface of the three-dimensional image transfer device, and (c) imaging the TAB/Pulp/TAB structured intermediate (whether pre-consolidated at operation 508 or not) by subjecting at least a second outermost surface to jets of fluid at a pressure sufficient to (i) physically entangle the first plurality of spunmelt fibers, the cellulosic fibers, and the second plurality of spunmelt fibers and (ii) impart a three-dimensional image to provide a composite nonwoven fabric having a 3D image thereon.

In accordance with certain embodiments of the invention, suitable three-dimensional imaging devices may comprise imaging sleeves include those described, for example, in RE38,105 and RE38,505, in which the contents of both are hereby incorporated by reference in their entirety. For example, the nonwoven fabric may include a three-dimensional image formed therein that may be formed throughout the nonwoven fabric. For example, the image transfer device may comprise one or more drums or even one or more sleeves affixed to a corresponding drum. One or more water jets, for example, may be applied to a side of the nonwoven opposite to the side contacting the image transfer device. Without intending to be bound by the theory, the one or more water jets and water directed through the nonwoven causes the fibers of the nonwoven to become displaced according to the image on the image transfer device such as the image formed on one or more drums or one or more sleeves affixed to a corresponding drum causing a three-dimensional pattern to be imaged throughout the nonwoven according to such image. Such imaging techniques are further described in, for example, U.S. Pat. No. 6,314,627 entitled "Hydroentangled Fabric having Structured Surfaces"; U.S. Pat. No. 6,735,833 entitled "Nonwoven Fabrics having a Durable Three-Dimensional Image"; U.S. Pat. No. 6,903,034 entitled "Hydroentanglement of Continuous Polymer Filaments"; U.S. Pat. No. 7,091,140 entitled "Hydroentanglement of Continuous Polymer Filaments"; and U.S. Pat. No. 7,406,755 entitled "Hydroentanglement of Continuous Polymer Filaments" each of which are hereby incorporated by reference in their entirety herein by reference.

EXAMPLES

The present disclosure is further illustrated by then following examples, which in no way should be construed as being limiting. That is, the specific features described in the following examples are merely illustrative and not limiting.

Test Methods

Dry machine direction (MD) tensile strength was measured according to American Society for Testing and Materials (ASTM) D5035.

Dry cross direction (CD) tensile strength was measured according to ASTM D5035.

Dry MD elongation was measured according to ASTM D5035.

Dry CD elongation was measured according to ASTM D5035.

Soak wet MD tensile strength was measured according to ASTM D5035.

Soak wet CD tensile strength was measured according to ASTM D5035.

Soak wet MD elongation was measured according to ASTM D5035.

Soak wet CD elongation was measured according to ASTM D5035.

Soak wet MD max elongation was measured according to ASTM D5035.

Soak wet MD max elongation was measured according to ASTM D5035.

Absorption capacity (Abs Capacity) was measured according to INDA Standard Tests (IST) 10.1.

MD softness was measured according to IST 90.3.

CD softness was measured according to IST 903.

Color b was measured according to ASTM D2244.

Taber Smooth was measured according to ASTM D3884/IST 20.4.

Example Set 1

15 gsm webs were produced via a R4 Reicofil bi-component spunbond line. The spunbond fibers had a sheath/core configuration, in which the core component was formed from a first PLA-composition (i.e., Ingeo™ Biopolymer 6100D from NatureWorks, USA) and the sheath component was formed from a second PLA-composition (i.e., Ingeo™ Biopolymer 6752D from NatureWorks, USA). The first PLA-composition had a melt index of 24 g/10 min per ASTM D1238 (210° C.) and a melt temperature from around 165-180° C. per ASTM D3418. The second PLA-composition had a melt index of 15 g/10 min per ASTM D1238 (210° C.) and a melt temperature from around 145-160° C. per ASTM D3418.

The webs of spunbond fibers were subjected to thermal calendering with a bond area of 18.8%. A first group of these webs were evaluated for machine direction tensile strength, machine direction elongation, cross-direction tensile strength, and cross-direction elongation after thermal calendering. A second group of webs were subjected to a TAB operation with an oven temperature of about 155° C. with dwell times between 10-14 seconds after being subjected to thermal calendering. After being subjected to the TAB operation, the resulting TAB nonwoven fabrics were evaluated for machine direction tensile strength, machine direction elongation, cross-direction tensile strength, and cross-direction elongation. FIG. 6 provides a graph comparing the physical properties for the first group and the second group. As shown by FIG. 6, the TAB nonwoven fabrics had a machine direction tensile strength that was about 2.6 times larger than the non-TAB treated material. Additionally, the TAB nonwoven fabrics had a cross-direction tensile strength that was over 12 times larger than the non-TAB treated material. FIG. 6 also illustrates that the TAB nonwoven fabrics also provided a larger degree of elongation.

Example Set 2

10 gsm webs were produced via a R4 Reicofil bi-component spunbond line. The spunbond fibers had a sheath/core configuration, in which the core component was formed from a first PLA-composition (i.e., Ingeo™ Biopolymer 6100D from NatureWorks, USA) and the sheath component was formed from a second PLA-composition (i.e., Ingeo™ Biopolymer 6752D from NatureWorks, USA). The first PLA-composition had a melt index of 24 g/10 min per ASTM D1238 (210° C.) and a melt temperature from around 165-180° C. per ASTM D3418. The second PLA-composition had a melt index of 15 g/10 min per ASTM D1238 (210° C.) and a melt temperature from around 145-160° C. per ASTM D3418. The web of spunbond fibers were subjected to thermal calendering with a bond area of 18.8% followed by being subjected to a TAB operation with an oven temperature of about 155° C. with dwell times between 10-14 seconds. A variety of physical properties of the resulting spunbond TAB nonwoven layers were compared to identically constructed nonwoven layers that had not been subjected to the TAB operation. Of particular interest, the spunbond TAB nonwoven layers exhibited an approximately 200% increase over the comparison nonwoven layers (i.e., non-TAB treated nonwoven layers). In this regard, this comparison highlights the surprising improvements in physical properties (e.g., tensile strength) associated with spunbond TAB nonwoven layers.

The spunbond TAB nonwoven layers as well as the comparative nonwoven layers were utilized in the construction of composite nonwoven fabrics. In particular, the spunbond TAB nonwoven layers and the comparative nonwoven layers were used to form composite nonwoven fabrics having a SB (10 gsm)/Pulp (42 gsm)/SB (10 gsm) construction that was subjected to hydroentanglement and imaging to provide final composite nonwoven fabrics for physical property testing. As shown in Tables 1A-1C, the composite nonwoven fabrics that utilized the spunbond TAB nonwoven layers provided tensile strength values similar to those realized by such constructions formed from polypropylene spunbond layers. Interestingly, the composite nonwoven fabrics incorporating the comparative spunbond nonwoven layers (i.e., non-TAB treated nonwoven layers) had tensile strength properties significantly lower.

TABLE 1A

|  | Basis Weight (gsm) | Bulk (mm) | Dry MD Tensile Strength (lb) | Dry MD Elongation (%) | Soak Wet MD Tensile Strength (lb) | Soak Wet MD Elongation (%) | Soak Wet MD Max Extension |
| --- | --- | --- | --- | --- | --- | --- | --- |
| Avg. Composite with TAB | 64.19 | 0.68 | 9.17 | 8.0 | 6.23 | 6.97 | 0.47 |
| Avg. Composite without TAB | 65.09 | 0.85 | 3.53 | 6.02 | 1.71 | 3.40 | 0.34 |
| Change | −0.89 | −0.17 | 5.64 | 1.98 | 4.52 | 3.57 | 0.13 |
| % Change |  |  | 160% |  | 264% |  |  |

TABLE 1B

|  | Dry CD Tensile Strength (lb) | Dry CD Elongation (%) | Soak Wet CD Tensile Strength (lb) | Soak Wet CD Elongation (%) | Soak Wet CD Max Extension |
| --- | --- | --- | --- | --- | --- |
| Avg. Composite with TAB | 4.80 | 43.00 | 4.20 | 43.00 | 1.90 |
| Avg. Composite without TAB | 3.86 | 17.22 | 2.83 | 19.07 | 0.87 |
| Change | 0.94 | 25.78 | 1.37 | 23.93 | 1.03 |
| % Change | 24% |  | 48% |  |  |

TABLE 1C

|  | Abs. Capacity (%) | MD Softness (grams) | CD Softness (grams) | Color b | Taber Smooth (cycles) |
|---|---|---|---|---|---|
| Avg. Composite with TAB | 917.38 | 208.13 | 72.88 | 3.17 | 18.3 |
| Avg. Composite without TAB | 968.00 | 84.63 | 16.88 | 3.11 | 9.25 |
| Change | −50.63 | 123.5 | 56.0 | 0.06 | 8.88 |
| % Change |  |  |  |  | 96% |

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A nonwoven fabric, comprising:
   (i) at least a first spunmelt through-air-bonded (TAB) nonwoven layer comprising a first plurality of spunmelt fibers; wherein (a) the first plurality of spunmelt fibers comprise continuous multi-component fibers comprising a first component including a first biopolymer composition and a second component including a second biopolymer composition, (b) the first biopolymer composition has a first melting temperature and a first melt index and the second biopolymer composition has a second melting temperature and a second melt index, (c) the first melting temperature is larger than the second melting temperature wherein a difference between the first melting temperature and the second melting temperature is from 5 to 15° C. and the second melt index is from 3 to 30 g/10 min smaller than the first melt index at 210° C. as determined according to ASTM D1238, and (d) the first spunmelt TAB nonwoven layer further comprises a first plurality of discrete first bond sites, the first plurality of discrete first bond sites comprise thermal bonds; and
   (ii) a plurality of cellulosic fibers physically entangled with the first plurality of spunmelt fibers; and
   wherein the plurality of cellulosic fibers comprise from 40 to 90% by weight of the nonwoven fabric.

2. The nonwoven fabric of claim 1, wherein the first plurality of discrete first bond sites define a first bonded area from 3 to 30%.

3. The nonwoven fabric of claim 1, wherein the first biopolymer composition and the second biopolymer composition each comprise a poly(lactic) acid (PLA), polyhydroxyalkanoates (PHA), a poly(hydroxycarboxylic) acids, or any combination thereof.

4. The nonwoven fabric of claim 1, wherein the first spunmelt TAB nonwoven layer comprises a spunbond layer.

5. The nonwoven fabric of claim 1, wherein the first plurality of spunmelt fibers comprise a sheath/core configuration, a side-by-side configuration, a pie configuration, an islands-in-the-sea configuration, a multi-lobed configuration, or any combinations thereof.

6. The nonwoven fabric of claim 5, wherein the first plurality of spunmelt fibers comprise a bi-component fiber wherein the first component comprises a core component and the second component comprises a sheath component.

7. The nonwoven fabric of claim 6, wherein the sheath component comprises an at least partially deformed configuration associated with the softening, at least partial flowing, and re-solidification into the at least partially deformed configuration, and wherein a thickness of the sheath component in the at least partially deformed configuration varies.

8. The nonwoven fabric of claim 6, wherein the first biopolymer composition comprises a first PLA or first PLA composition and the second biopolymer composition comprises a second PLA or a second PLA composition.

9. The nonwoven fabric of claim 1, further comprising a second nonwoven layer directly or indirectly bonded to the first TAB nonwoven layer; wherein the second nonwoven layer may comprise one or more of an additional biopolymer, one or more synthetic polymer, or any combination thereof.

10. The nonwoven of claim 9, wherein the second nonwoven layer comprises one or more spunbond layers, one or more meltblown layers, one or more carded nonwoven layers, one or more mechanically bonded nonwoven layers, or any combination thereof.

11. The nonwoven fabric of claim 1, further comprising a second nonwoven layer, wherein the second nonwoven layer is physically entangled with the cellulosic fibers, the first plurality of spunmelt fibers, or both.

12. The nonwoven fabric of claim 1, further comprising a second spunmelt (TAB) nonwoven layer comprising a second plurality of spunmelt fibers; wherein the second plurality of spunmelt fibers may be the same or different than the first plurality of spunmelt fibers.

13. The nonwoven fabric of claim 12, wherein the first plurality of spunmelt fibers is physically entangled with the cellulosic fibers, and the second plurality of spunmelt fibers is physically entangled with the cellulose fibers.

14. The nonwoven fabric of claim 1, wherein the first plurality of spunmelt fibers comprise a side-by-side configuration, a pie configuration, an islands-in-the-sea configuration, a multi-lobed configuration, or any combinations thereof.

15. The nonwoven fabric of claim 1, wherein the first spunmelt TAB nonwoven layer comprises abrasive particles intermixed with the first plurality of spunmelt fibers.

16. The nonwoven fabric of claim 1, wherein the first spunmelt TAB nonwoven layer comprises abrasive particles disposed within the melt used for forming the first plurality of spunmelt fibers.

* * * * *